United States Patent [19]
Takahashi et al.

[11] Patent Number: 5,185,783
[45] Date of Patent: Feb. 9, 1993

[54] COMMUNICATION APPARATUS FOR DETECTING A CALLING SIGNAL FROM A LINE, FOR DETECTING A DATA COMMUNICATION SIGNAL FROM A CALLING STATION, AND FOR GENERATING A QUASI-CALLING TONE

[75] Inventors: Taketo Takahashi; Tsunehiro Watanabe, both of Tokyo; Teruyuki Nishii, Yokohama; Yasuhide Ueno, Tokyo, all of Japan

[73] Assignee: Canon Kabushiki Kaisha, Tokyo, Japan

[21] Appl. No.: 829,592

[22] Filed: Feb. 3, 1992

Related U.S. Application Data

[63] Continuation of Ser. No. 573,684, Aug. 28, 1990, abandoned.

[30] Foreign Application Priority Data

Aug. 30, 1989 [JP] Japan .............. 1-224105

[51] Int. Cl.$^5$ ............................................. H04M 11/00
[52] U.S. Cl. ................................. 379/93; 358/400; 379/97
[58] Field of Search ............... 379/100, 96-98, 379/102, 104, 105, 93; 358/400

[56] References Cited

U.S. PATENT DOCUMENTS

| | | |
|---|---|---|
| 4,353,097 | 10/1982 | Takeda et al. |
| 4,646,347 | 2/1987 | Liu ............................ 379/164 |
| 4,663,778 | 5/1987 | Takahashi |
| 4,677,660 | 6/1987 | Yoshida |
| 4,800,439 | 1/1989 | Yoshino |
| 4,811,385 | 3/1989 | Watanabe |
| 4,815,121 | 3/1989 | Yoshida |
| 4,837,806 | 6/1989 | Watanabe |
| 4,843,479 | 6/1989 | Yoshino et al. |
| 4,864,412 | 9/1989 | Ueno |
| 4,868,865 | 9/1989 | Ogawa et al. ................ 379/100 |
| 4,910,764 | 3/1990 | Bowen ............................ 379/100 |
| 4,916,607 | 4/1990 | Teraichi et al. |
| 4,932,048 | 6/1990 | Kenmochi et al. |
| 4,947,423 | 8/1990 | Watanabe |

FOREIGN PATENT DOCUMENTS

| | | | |
|---|---|---|---|
| 59-175277 | 10/1984 | Japan ............................ 379/100 |
| 63-148750 | 6/1988 | Japan ............................ 379/100 |
| 2212363 | 7/1989 | United Kingdom |

Primary Examiner—James L. Dwyer
Assistant Examiner—Wing F. Chan
Attorney, Agent, or Firm—Fitzpatrick, Cella, Harper & Scinto

[57] ABSTRACT

A communication apparatus includes a first detector for detecting a calling signal from a line, a tone generator for generating quasi-calling tone and sending it out to the line, a second detector for detecting a signal indicating the data communication from a calling station, and a control unit for starting the data communication in response to the detection by the second detector. The second detector detects the signal while the tone generator sends out the quasi-calling tone when the calling signal is received.

22 Claims, 17 Drawing Sheets

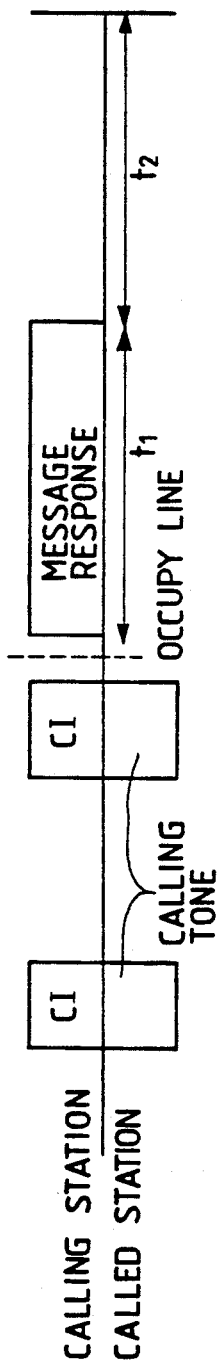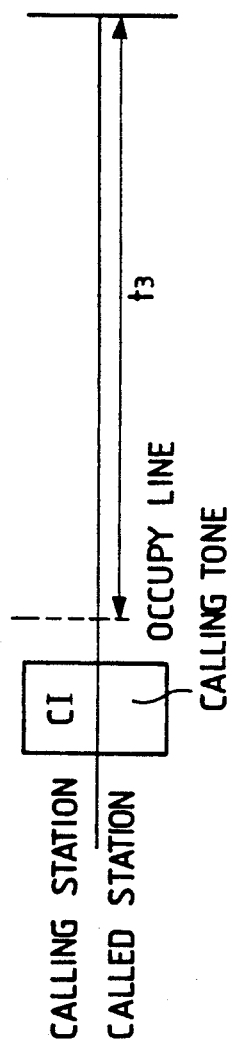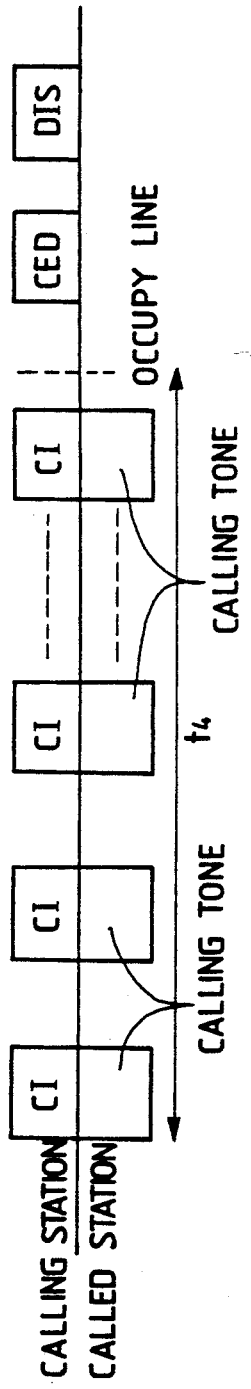

IF FREQ COMPONENT OF (c+n)Hz (c<c+n<b) IS DETECTED, INCREMENT COUNT VALUE CORRESPONDING TO THE FREQ COMPONENT.

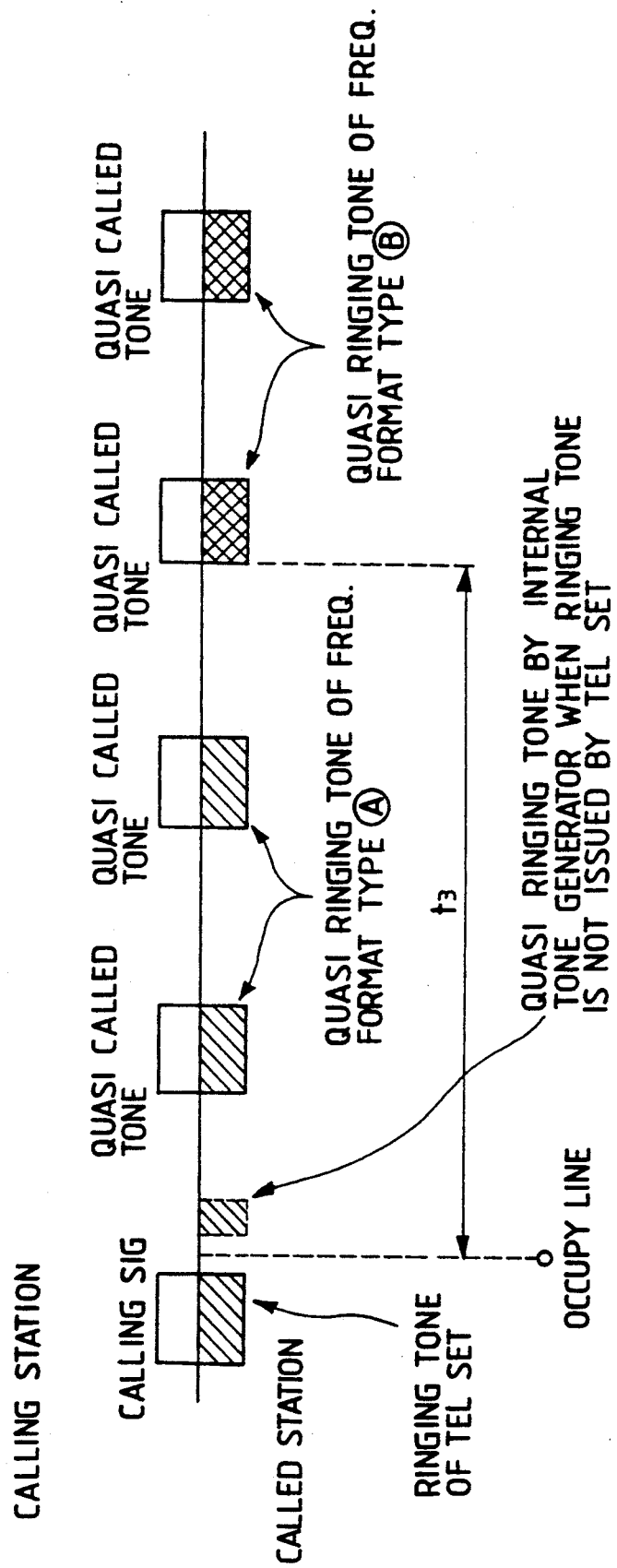

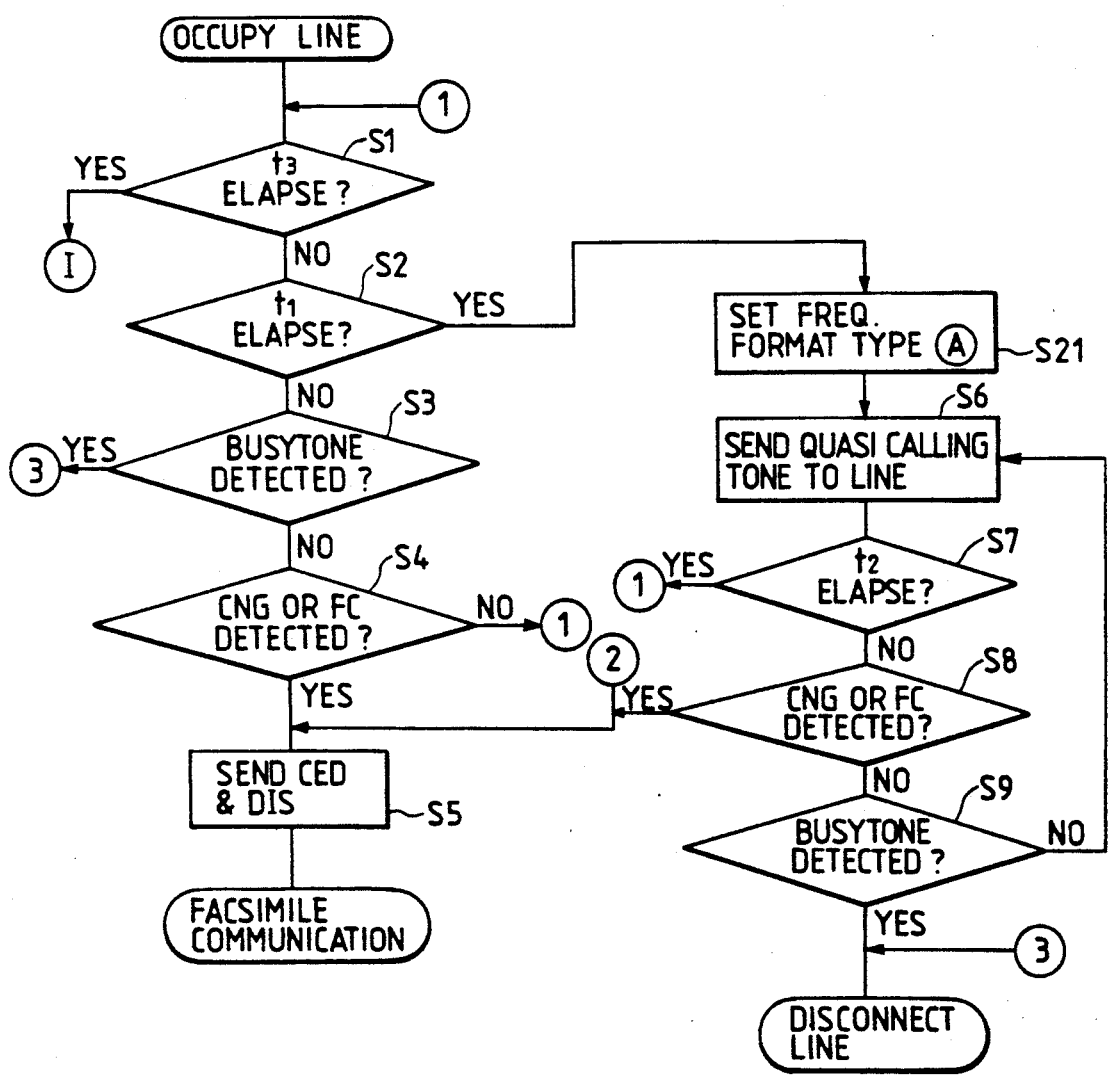

COMMUNICATION APPARATUS FOR DETECTING A CALLING SIGNAL FROM A LINE, FOR DETECTING A DATA COMMUNICATION SIGNAL FROM A CALLING STATION, AND FOR GENERATING A QUASI-CALLING TONE

This application is a continuation of application Ser. No. 07/573,684 filed on Aug. 28, 1990, now abandoned.

BACKGROUND OF THE INVENTION

1. Field of the Invention

The present invention relates to a communication apparatus which can selectively execute speech communication and data communication.

2. Related Background Art

As an apparatus of this type, a facsimile device which communicates image data has been known. Prior art facsimile devices have a function to automatically determine whether a calling station is a human (telephone set) or a facsimile device when it receives a call (hereinafter TEL/FAX automatic switching function). There have been known three methods for implementing the TEL/FAX automatic switching.

In a first method, after a line has been captured at the reception of a call, a voice message (for example, "please say hellow if it is a telephone and depress a start button if it is a facsimile device") is sent to a calling station, and a signal from the calling station is thereafter monitored. If voice is detected, it is determined that the calling station wants the speech communication and a bell in the facsimile device or a built-in telephone set is rung to call an operator. If the signal from the calling station is a CNG signal (call tone signal) or if the no signal status continues for longer than a predetermined time period ($t_2$), it is determined that the calling station is a facsimile device, and a called device identification signal (CED) and a digital identification signal (DIS) are sent out and the facsimile communication is then automatically started. (See FIG. 8A).

In a second method, after the line has been captured at the reception of the call, no response is made for a predetermined time period ($t_3$) and the CNG signal or voice signal from the calling station is monitored. Like in the first method mentioned above, if the voice signal is detected, the operator is called, and if the CNG signal is detected or no signal is detected during the time period $t_3$, the facsimile communication is automatically started. (See FIG. 8B).

In a third method, when a call is received, an operator is called without capturing the line for a predetermined time period $t_4$ (which may be arbitrarily set). If an off-hook state of a hand set by the operator is detected during the time period $t_4$, the device subsequently functions as a telephone set, and if no off-hook state is detected in the time period $t_4$, it is determined that the calling station is a facsimile device and the facsimile communication is thereafter started. (See FIG. 8C).

The techniques of the TEL/FAX automatic switching described above are disclosed in U.S. Pat. No. 4,677,660, U.S. Pat. No. 4,663,778, U.S. Pat. No. 4,815,121, U.S. Pat. No. 4,800,439, U.S. Pat. No. 4,932,048, U.S. Pat. No. 4,916,607 and U.S. Pat. No. 4,353,097.

The prior art devices, however, include the following problems.

In the first method, the voice response is hard to listen if a line condition is bad.

Further, if a person at the calling station is not accustomed to the voice response, it may happen that the absence of operator at the called station is determined at a stage of the first voice message and the line is opened. Further, it is unnatural to force the person at the calling station to speak.

Further, as shown in FIG. 8A, 10-15 seconds are required for $t_1$, 5-10 seconds are required for $t_2$, and total of 15-25 seconds are required. As a result, a considerable time is required for the TEL/FAX automatic switching.

In the second method, since no voice response is given to the calling station for $t_3$ (5-10 seconds) time period, it imparts a strange feeling to the operator, who may consider that there is trouble on the line and may open the line.

In the third method, if the calling station is a facsimile device, the $t_4$ time period is always required before the facsimile communication is started, and smooth switching to the facsimile communication is not attained.

Further, if the operator at the called station does place the line in a hook off state in $t_4$ time period, the facsimile communication is started even if the calling station is a telephone set. Accordingly, an efficiency of the TEL/FAX switching is low.

SUMMARY OF THE INVENTION

It is an object of the present invention to provide an improved communication apparatus in view of the problems described above.

It is another object of the present invention to attain smooth switching between data communication and speech communication.

It is another object of the present invention to provide a communication apparatus which detects a signal indicating data communication upon reception of a call while a quasi-calling tone is sent to a calling station, and starts the data communication when the signal is detected so that smooth switching between the data communication and the speech communication is attained.

It is still another object of the present invention to attain automatic switching between the data communication and the speech communication with a short transition time from the reception of a call to the start of the data communication.

Other objects of the present invention will be apparent from the following detailed description of the embodiments and the drawings.

BRIEF DESCRIPTION OF THE DRAWINGS

FIGS. 8A, 8B and 8C show prior art TEL/FAX switching, FIG. 14 shows a modification of the quasi-called tone in embodiment 6, FIG. 15, 15A, 15B show a flow chart of a control operation of the embodiment 6.

DETAILED DESCRIPTION OF THE PREFERRED EMBODIMENTS

The preferred embodiments of the present invention will now be described with reference to the drawings. In the following embodiments, a facsimile device is described although the present invention is applicable to not only the facsimile device but also any other data communication apparatus such as a telex device.

Figure 1:
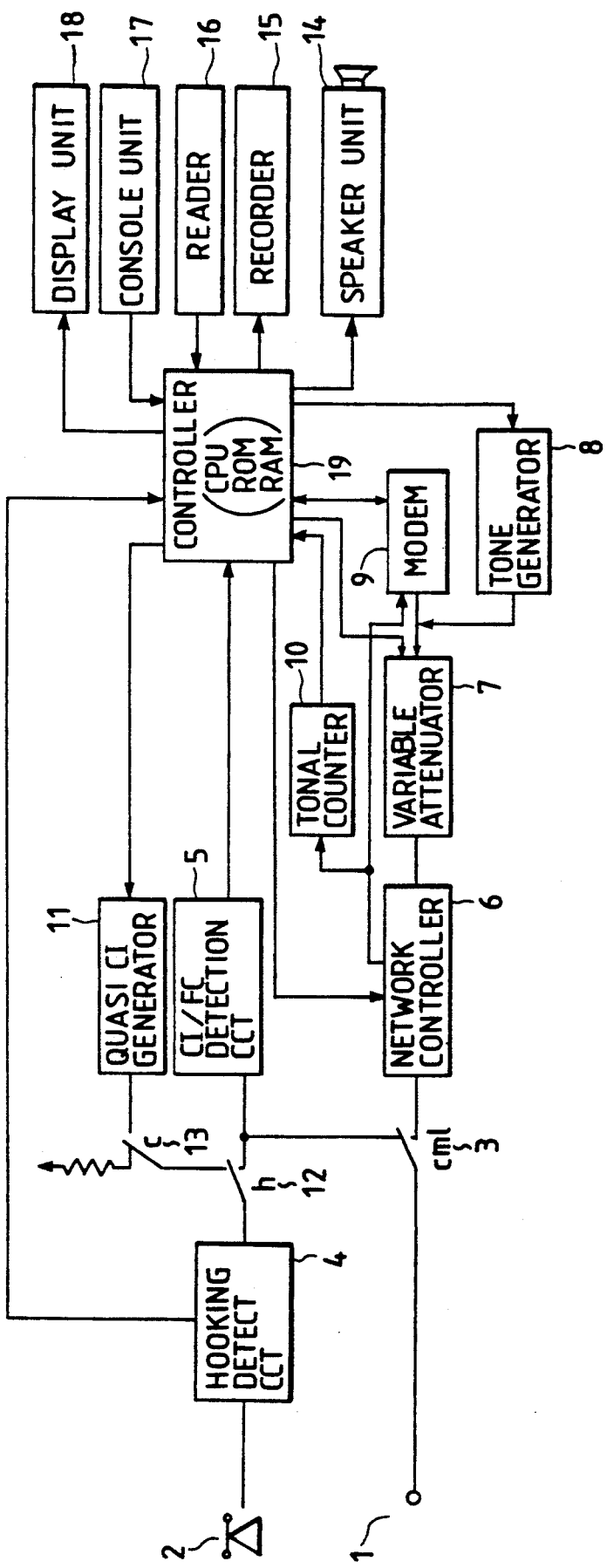
FIG. 1 shows a configuration of a facsimile device in one embodiment.

FIG. 1 shows a block diagram of a configuration of a facsimile device in one embodiment. In FIG. 1, numeral 1 denotes a telephone line to which the present device is connected, numeral 2 denotes a telephone set to be connected to the present device, numeral 3 denotes a relay CML which selectively connects the telephone set or the device to a line, numeral 4 denotes a hook status detector for detecting status of a hand set of the telephone set, numeral 5 denotes a CI/FC detector for detecting an incoming calling signal (CI) from the line or a called signal (FC) of a facsimile network, numeral 6 denotes a network controller for electrically interfacing with the line, numeral 7 denotes a variable attenuator for varying a send-out level of a signal to be sent out to the line, numeral 8 denotes a tone generator for generating a tone signal to be sent out to the line, numeral 9 denotes a modem for facsimile communication, numeral 10 denotes a tonal counter for counting a frequency of an incoming tonal signal from the line, numeral 11 denotes a quasi-CI signal generator for ringing a ringer of the telephone set from the device, numeral 12 denotes a relay H for selectively connecting the telephone set or the device to the line, numeral 13 denotes a relay C for connecting the quasi-CI signal generator to the telephone set, numeral 14 denotes a speaker for generating sound, numeral 15 denotes a recorder such as a printer, numeral 16 denotes a reader for reading a document, numeral 17 denotes a console unit comprising key entry switches for instructing operations of the device and a key entry scanner, numeral 18 denotes a display unit comprising a liquid crystal display and an LED, and numeral 19 denotes a controller for controlling the overall device. The controller 19 comprises a microcomputer, a read-only memory (ROM) which stores a control program, a random access memory (RAM) and other peripheral circuits of the microcomputer.

EMBODIMENT 1

An operation of the present embodiment is now explained in detail.

Figure 2:
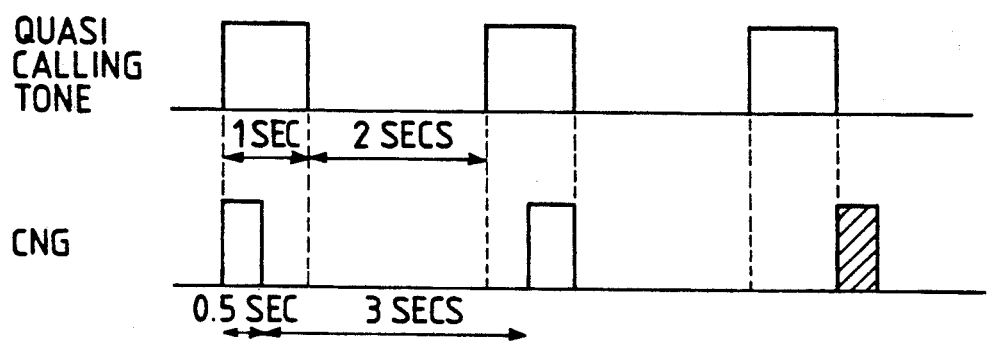
FIGS. 2 and 3 show time relations between the send-out of a quasi-calling tone (quasi-called tone) and the reception of CNG.
Figure 5:
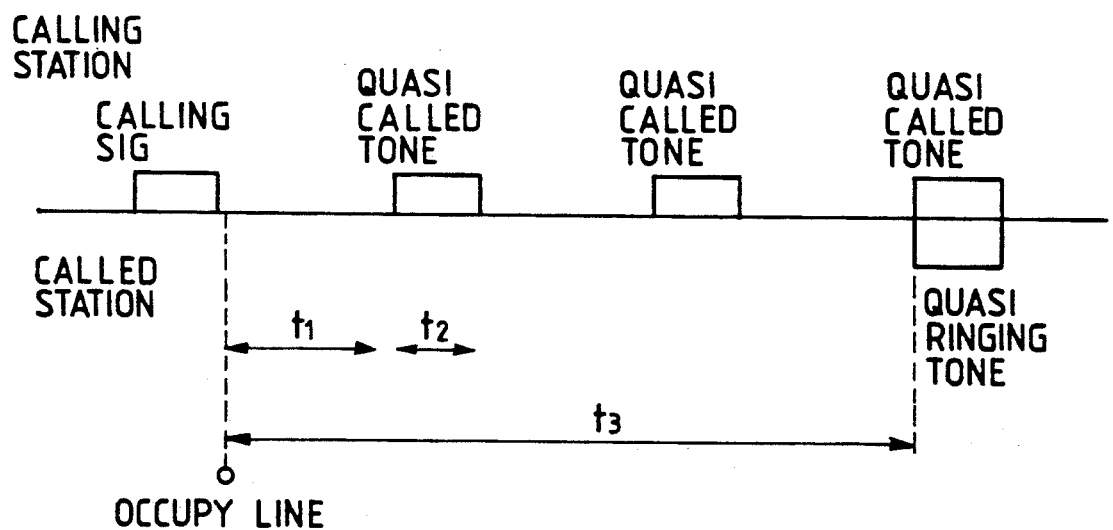
FIG. 5 shows a send-out timing of the quasi-called tone in the embodiment.
Figure 6A:
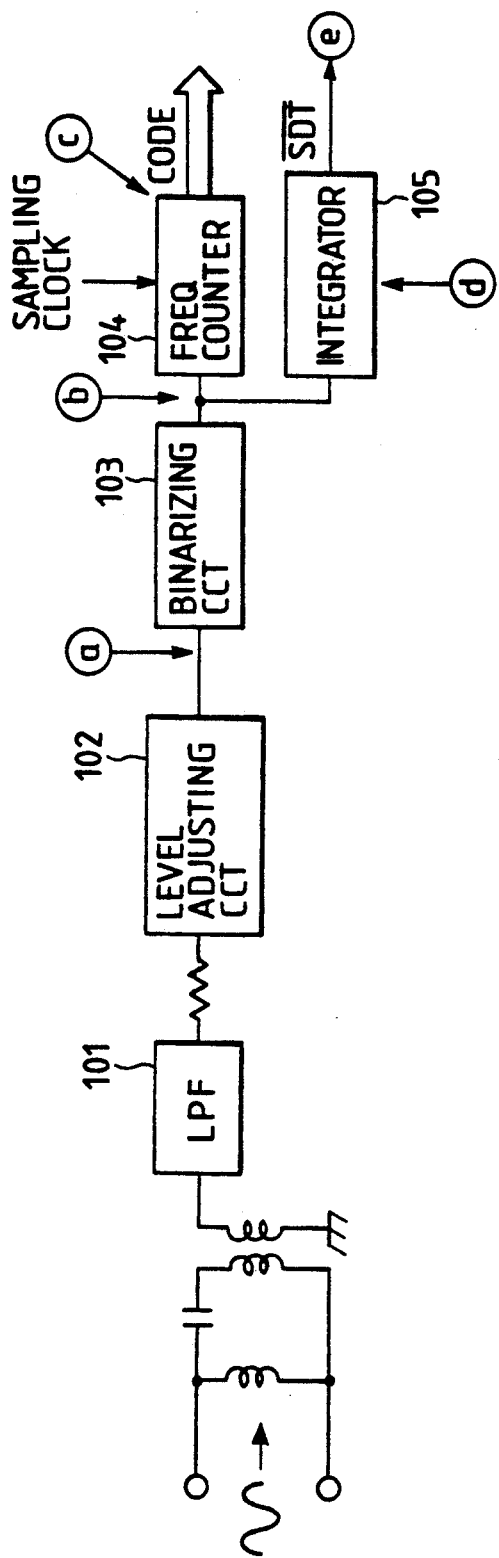
FIGS. 6A and 6B show a configuration of a tonal counter 10 and signals thereof.
Figure 6B:
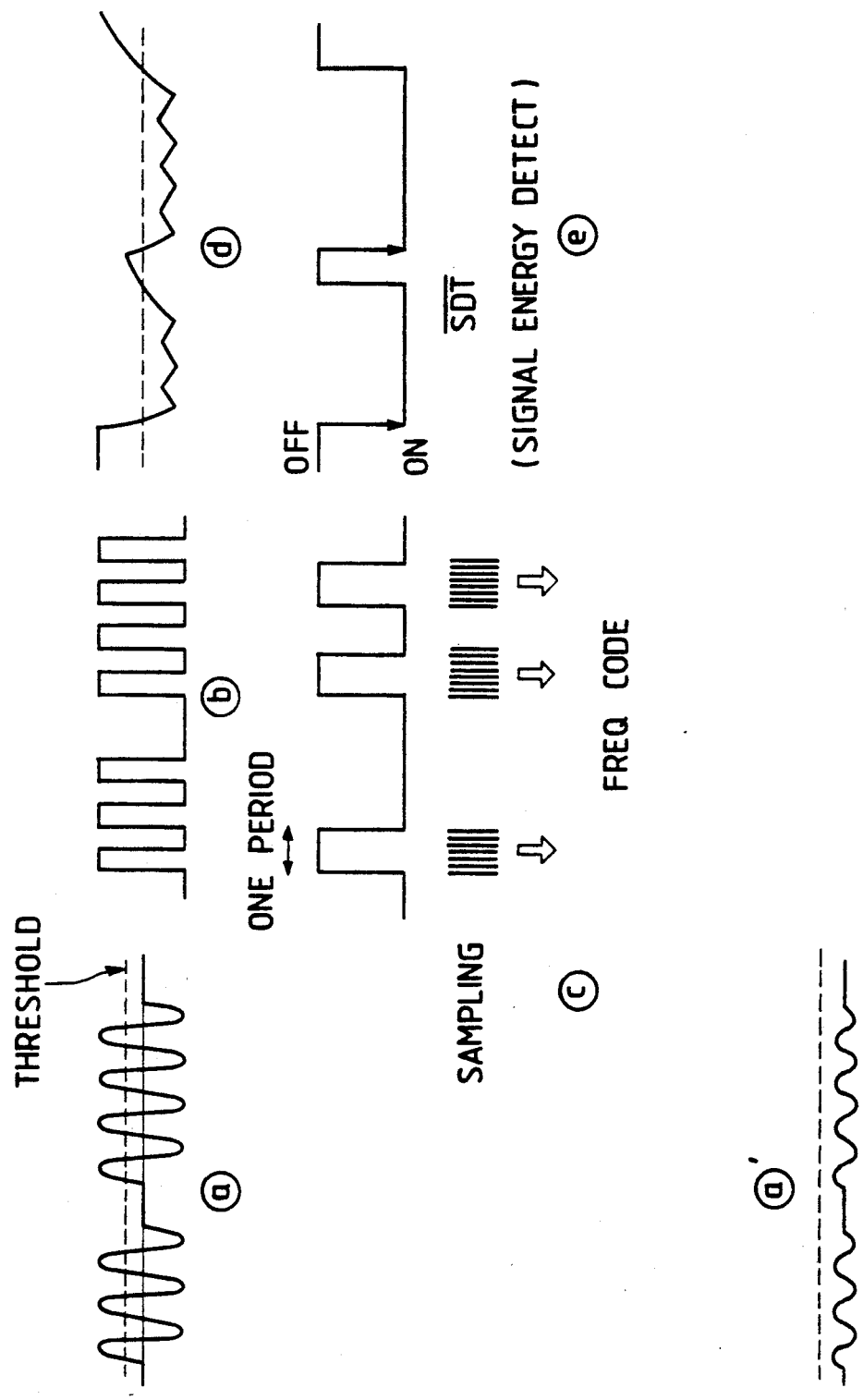

First, the present device is set in an auto-receive mode (auto-facsimile communication mode) and in a mode in which a telephone set connected is not rung by an external calling signal from the telephone line. This is done by setting the relay H of FIG. 1 to an off position. Under this condition, when the calling signal sent from a terminal station through the telephone line 1 is detected by the CI/FC detector 5, the cml relay is closed (turned on) to capture the line 1. Then, a significant signal from the calling station is monitored for $t_1$ time period as shown in FIG. 5. The significant signal is detected by the tonal counter 10 and the modem 9 through the network controller 6. The tonal counter 10 is configured as shown in FIG. 6A. The tonal counter 10 comprises a low pass filter 101, a level adjuster 102, a binary circuit 103, a frequency counter 104 and an integrator 105. FIG. 6B shows input and output signals of the tonal counter 10. An input signal ⓐ passes through the LPF 101 and the level adjuster 102 and is binarized by the binary circuit 103. When the input signal does not exceed a threshold as shown in ⓐ, the binary circuit 103 does not operate and no signal is produced. The binarized input signal ⓑ is counted by the frequency counter 104 to determine a frequency code of the input signal. (See ⓒ in FIG. 6(B)). The presence or absence of signal energy is determined by the integrator 105 to prevent mulfunction by a noise. (See ⓓ and ⓔ in FIG. 6(B)). The modem 9 detects a 300 bps binary protocol signal. In FIG. 5, when the CNG is detected in the first $t_1$ time period, it is determined that the calling station is a facsimile device and a called equipment identification signal (CED) and a digital identification signal (DIS) are sent out, and the facsimile communication is started. In this case, the facsimile communication is attained without ringing a calling tone at the called station before and after the reception of the call. As shown, the device repeats a quasi-called tone sequence with an off-time $t_1$ and an on-time $t_2$ in order to prevent a strange feeling from being given to an operator at the calling station after the reception of the call, and $t_1$ is set to two seconds and $t_2$ is set to one second to cope with an exchange of a common public network. The quasi-called tone is sent out to the line 1 by the tone generator 8. In this case, since the signal sequence of the CNG is on-time for 0.5 second and off-time for three seconds as shown in FIG. 2, there may be a timing which do not permit detection by the monitoring time of $t_1$ (2 seconds) period. Thus, the present device repeatedly monitors the quasi-called tone in every off-time for an initial identification time $t_3$ as shown in FIG. 5. If the calling station is a human or a facsimile device which does not send out the CNG, the device activates the built-in sound generator 14 (quasi-bell tone) after the $t_3$ period to inform the call to the operator at the called station and continuously send out the quasi-called tone to the telephone line 1.

Since it is possible that the calling station opens the telephone line, the significant signals such as CNG and FC as well as a busy tone from an exchange for the line 1 are monitored. If the busy tone is detected, the line is immediately opened so that the telephone line is efficiently utilized. The shorter the time $t_3$ is, the more preferable it is. It is set to 8 second for the following reason.

Figure 3:
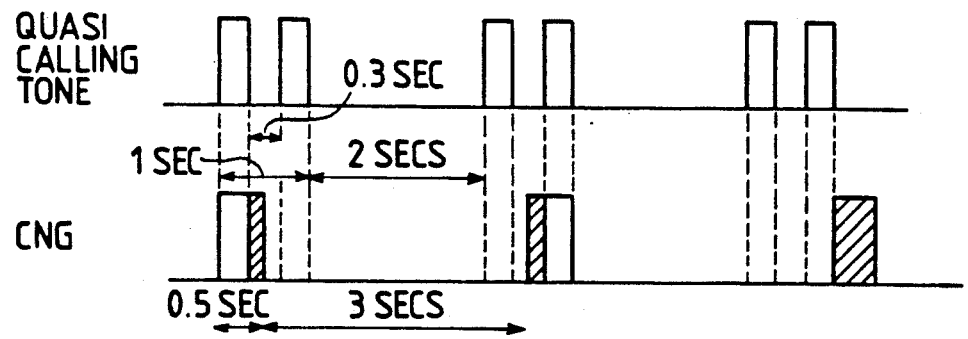
Figure 4:
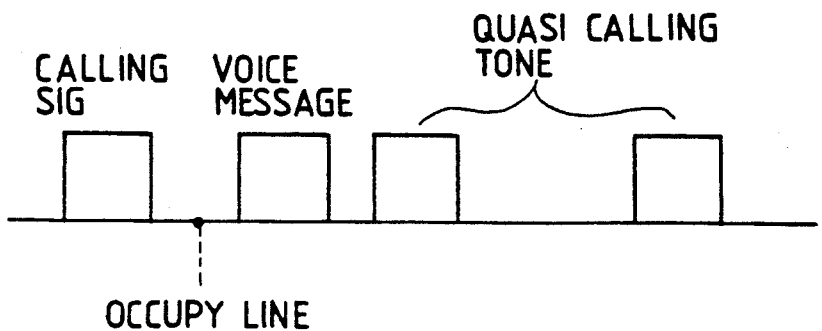
FIG. 4 shows a send-out timing of a voice message.

As described above, the signal sequence of the CNG is 0.5-second on-time and 3-second off-time. Taking a time margin of 15% as requested by the CCITT Standard into consideration, a monitoring time of 4.025 seconds is required to assure detection without fail. In the present embodiment, since a half-duplex communication system is used, a signal from the calling station cannot be monitored when the device sends out the signal (quasi-called signal). In this case, 9.5 seconds are required in a worst case as shown in FIG. 2 and approximately 11 seconds are required before the quasi-bell tone is rung. In the present embodiment, a 0.3-second off-time is provided in the 1-second on-time of the quasi-called tone as shown in FIG. 3 and the signal is monitored during that period. Thus, in case of FIG. 3, the CNG signal component of approximately 0.3 second can be detected for six seconds. As a result, the time required is essentially the same as that for the full duplex communication system. For this reason, $t_3$ is set to 8 seconds including subsequent 2-second off-time. As described above, even in the course of the $t_3$ period the facsimile communication is started when the significant signal CNG or FC is detected.

If the significant signal from the calling station is not detected in the $t_3$ period, the quasi-called tone is sent out to the line 1 and the built-in speaker 14 is rung to inform the call to the operator of the called station. The ringing of the built-in speaker 14 is synchronized with the quasi-called tone sent out to the line 1 so that the significant signal and the busy tone can be continuously monitored during the intervals of the signals and the apparatus can cope with a facsimile device which sends out the CNG with a delay. After the $t_3$ period, the above signals as well as the off-hook state of the telephone set are monitored, and if the off-hook state is detected by the off-hook detector 4, the line 1 is immediately switched to the telephone set 2. The call time after the $t_3$ period is approximately one minute while taking the non-detection of the busy tone into consideration. After the period, the cml relay is activated to open the telephone line 1 so that the apparatus returns to a stand-by status.

Figures 7, 7A:
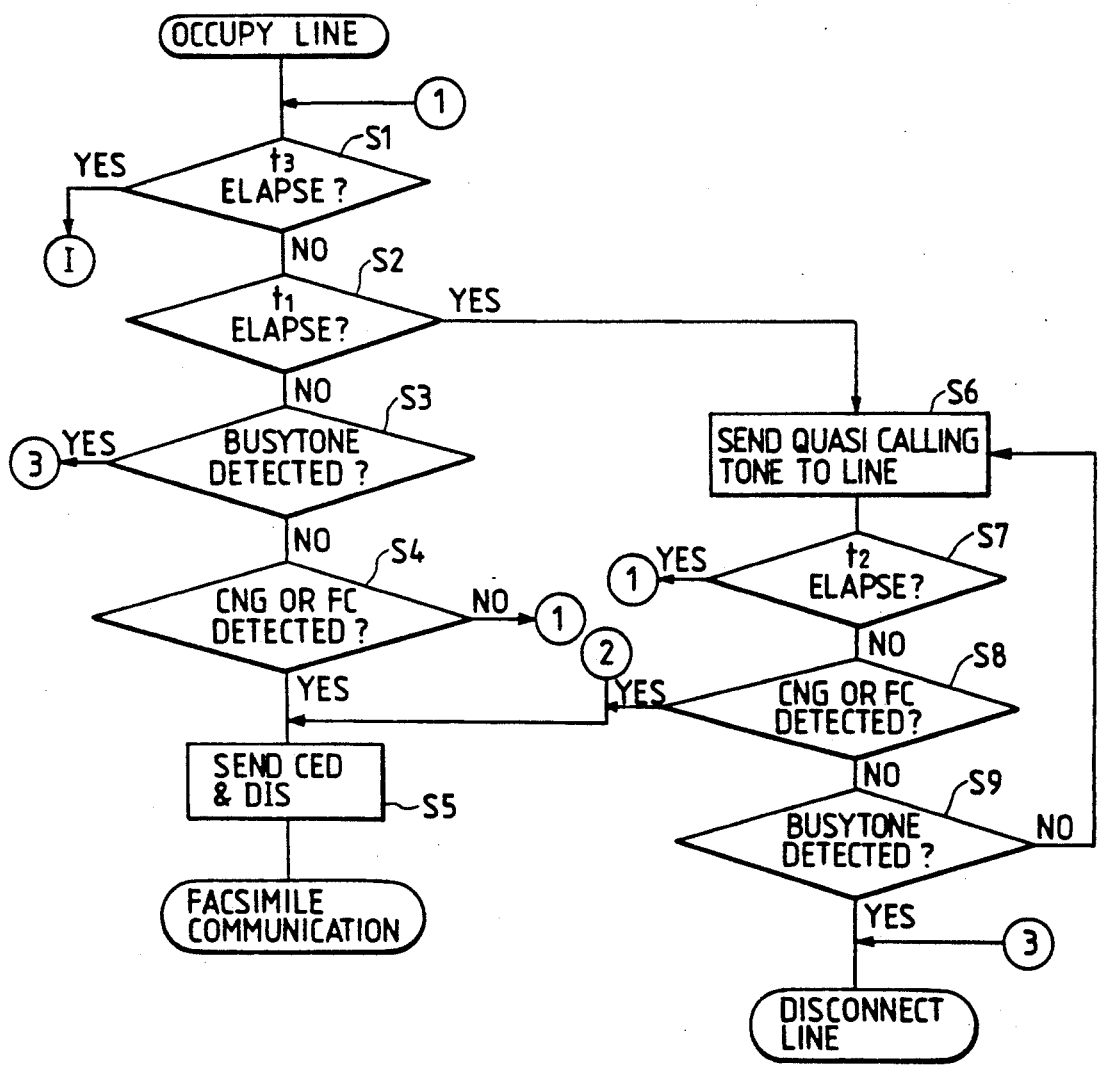
FIG. 7, 7A, 7B show a flow chart of a control operation by a controller 19 in the embodiment.
Figure 7B:
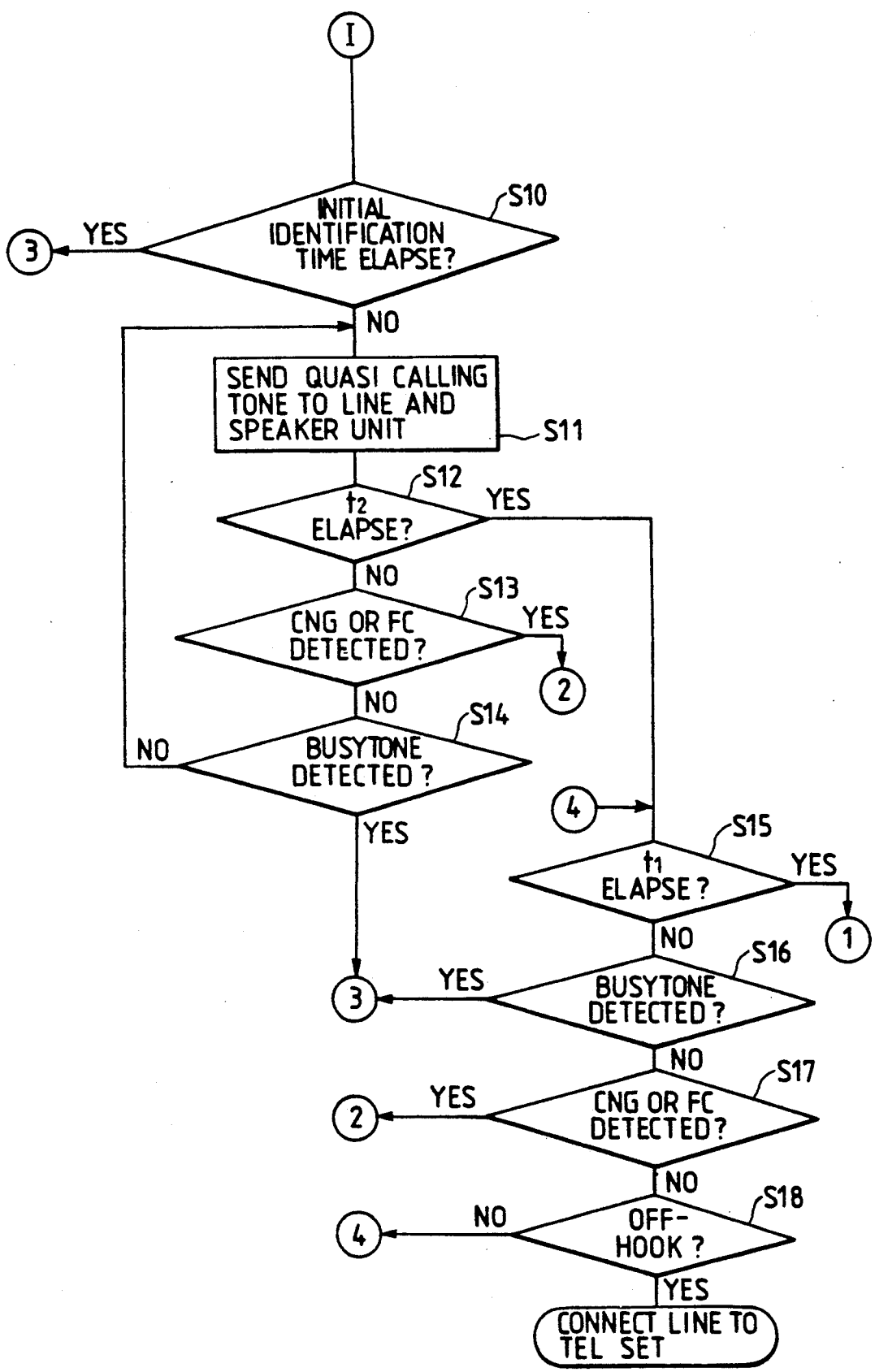

FIG. 7 shows a flow chart of a control operation of the controller 19 in the present embodiment. The control operation of the controller 19 is now explained with reference to the flow chart of FIG. 7.

When a call detection signal is supplied from the CI/FC detector 5, the controller 19 activates the cml relay 3 to capture the line, and starts the timer $t_1$ (2 seconds), the timer $t_3$ (8 seconds) and the initial identification timer T (35 seconds). Then, the process proceeds to a step S1.

In the step S1, whether the time $t_3$ has been elapsed or not since the line was captured (whether the timer $t_3$ has timed out or not) is determined. If the timer $t_3$ has not timed out, the process proceeds to a step S2. In the step S2, whether the timer $t_1$ has timed out and the time $t_1$ has been elapsed or not is determined. If the timer $t_1$ has not timed out, whether the busy tone has been detected or not is determined in a step S3, and whether the CNG signal or the FC signal has been detected or not is determined in a step S4. If the CNG signal or the FC signal is not detected, the process returns to the step S1. In this manner, in the $t_1$ period shown in FIG. 5, the busy tone and the CNG/FC signals are monitored, and if the CNG or FC signal is detected, the process proceeds from the step S4 to a step S5 so that the CED signal and the DIS signal are sent out to the line through the modem 9 and the facsimile communication is started. If the busy tone is detected in the step S3, the line 1 is opened and the control operation is terminated. The busy tone and the CNG signal are detected by determining the distribution of the frequency detection by the tonal counter 10.

When the timer $t_1$ times out after the period $t_1$ from the reception of the call, the process proceeds from the step S2 to a step S6 to start the timer $t_2$ and cause the tone generator 8 to send out the quasi-calling tone to the line 1.

In a step S7, whether the timer $t_2$ has timed out or not is determined. If the timer $t_2$ has not timed out, the detection of the CNG/FC signals and the detection of the busy tone are checked in steps S8 and S9 in the same manner as that in the steps S4 and S3.

If the timer $t_2$ has timed out in the step S7, the send-out of the quasi-calling signal to the line 1 is stopped, the timer $t_1$ is started again, and the process returns to the step S7. In this manner, the quasi-calling tone (quasi-called tone) is sent out to the line 1 for the period $t_2$ of FIG. 5.

On the other hand, if the time-out of the timer $t_3$ is detected in the step S1 (the period $t_3$ has been elapsed since the line was captured), the process proceeds from the step S1 to a step S10. In the step S10, whether the initial identification timer T has timed out or not (whether the initial identification time has been elapsed or not since the line was captured) is determined, and if the initial identification time has been elapsed, the line 1 is opened.

If the initial identification timer T has not timed out, the process proceeds from the step S10 to a step S11 to start the timer $t_2$ and cause the tone generator 8 to send out the quasi-calling tone to the line 1 and cause the speaker 14 to generate a calling sound to call an operator. In a step S12, whether the timer $t_2$ has timed out or not is determined. If the timer $t_2$ has not timed out, the detection of the CNG/FC signals and the detection of the busy tone are checked in steps S13 and S14 in the same manner as that in the steps S4 and S3. If none of the signals is detected, the process returns from the step 14 to the step S11.

On the other hand, if the time-out of the timer $t_2$ is detected in the step S12, the timer $t_2$ is started, and the process proceeds to a step S15 to determine whether the timer $t_1$ has timed out or not If the timer $t_1$ has timed out, the process returns to the step S1. If the timer $t_1$ has not timed out, the detection of the busy tone and the detection of the CNG/FC signals are checked in steps S16 and S17 in the same manner as that in the steps S3 and S4. If neither busy tone nor CNG/FC is detected, the process proceeds to a step S18 to cause the hook status detector 4 to check if the hand set of the telephone set 2 has been placed in an off hook state or not. If the off-hook state is not detected in the step S18, the process returns to the step S15. If the off-hook state is detected, the cml relay 3 is deactivated and the relay H is activated to connect the line 1 to the telephone set 2 to permit the speech communication.

By the above control, the TEL/FAX automatic switching is attained.

A principle of signal detection by the tonal counter 10 is now explained.

Figure 9:
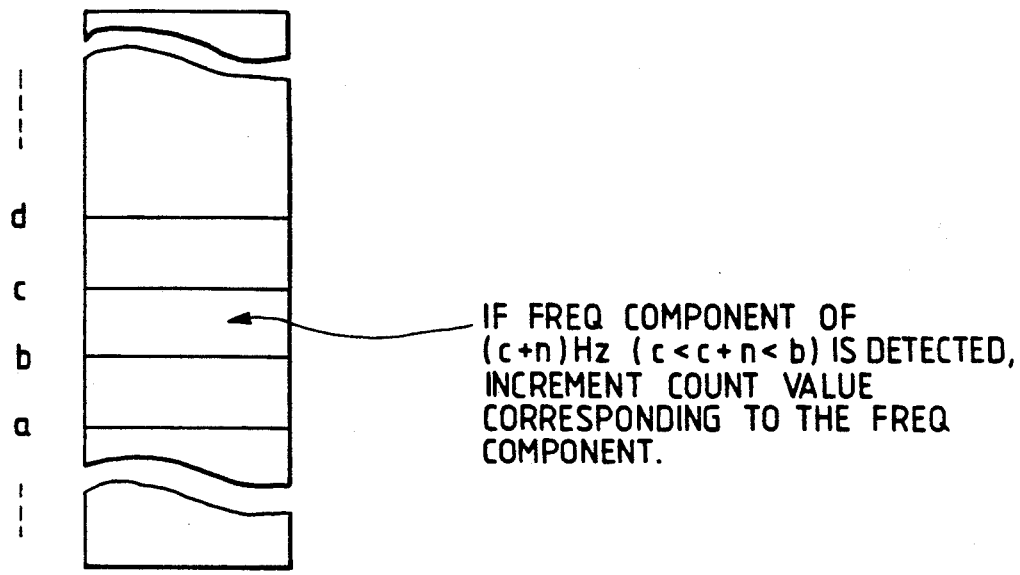
FIG. 9 shows a counter on a RAM of the tonal counter 10.
Figure 10A:
FIGS. 10A and 10B illustrate counting by the tonal counter 10.
Figure 10B:
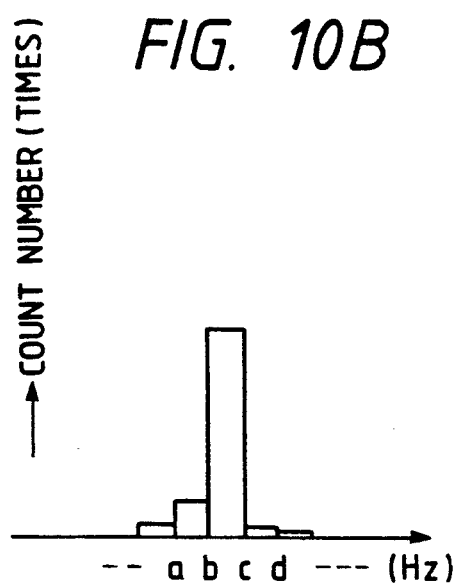

The frequency band of 300–3.4 K Hz detected by the tonal counter 10 is divided into a plurality of areas. (For example, since the CNG signal is 1100 Hz, it is divided by a 1000–1200 Hz pitch.) Counters are arranged on the RAM of the controller 19 of FIG. 1, one for each area. The corresponding area of the frequency data detected by the tonal counter 10 of FIG. 1 is determined and the corresponding counter is incremented by one. From the distribution of the frequency components at the end of a predetermined count or at the end of detection period, the facsimile signal, CNG signal, busy tone or voice signal is discriminated. The above frequency detection is shown in FIGS. 9 and 10. The magnitude relation of the frequencies is a>b>c <d and n<b.

As shown in FIG. 9, the frequency components of the signal detected during the detection period are analyzed and the counts of the RAM areas corresponding to the frequencies are incremented or decremented. After the detection period, the counts of the RAM are checked. If the frequency components of the signal spread over a wide range and the count in a specific frequency component range is smaller than a predetermined value (a reference to detect a single signal, determined in consideration of various conditions of communication) as shown in FIG. 10A, it is determined that the signal is a voice signal. If the count for the specific frequency component is larger than the reference to detect the single signal, the signal of that frequency component is detected. In order to determine a proportion, a normalization operation is carried out by using a sum of counts of all counters for all areas as a mother figure.

By the principle described above, the CNG and the busy tone can be detected by the tonal counter 10. As described above, the voice signal can also be detected by the tonal counter 10. Accordingly, a step to detect the voice signal may be inserted between the steps S3 and S4, between the steps S8 and S9, between the steps S8 and S17, and between the steps S16 and S17 so that the speaker is rung when the voice signal is detected to inform to the operator of the reception of the call. As a result, the transition time to the speech may be shortened. The voice signal may be detected by detecting the voice signal a predetermined number of times continuously wherein Embodiment 1.

EMBODIMENT 2

Figure 11:
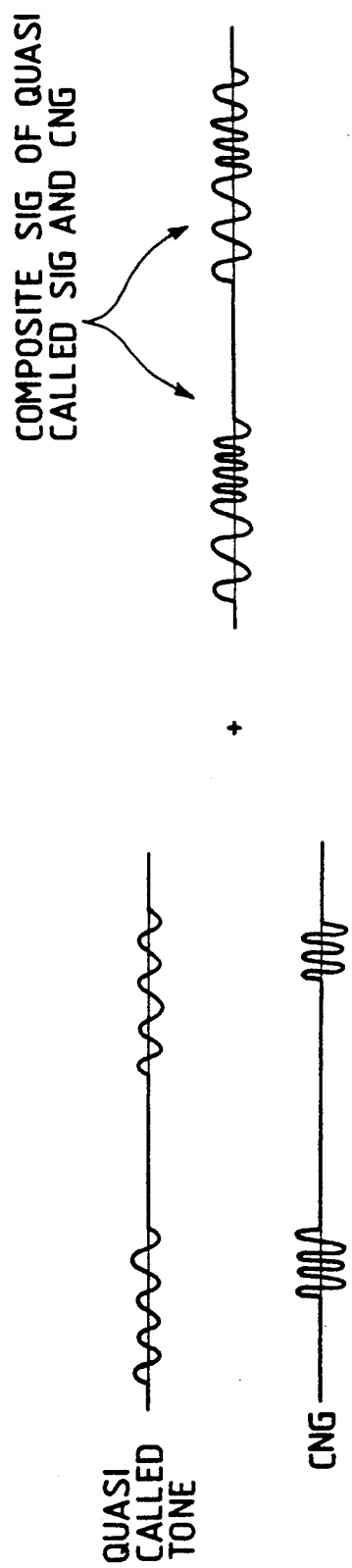
FIG. 11 shows a superimposed signal of the CNG and the quasi-called tone (quasi-calling tone)

If the quasi-calling tone to be sent out to the line 1 is a single frequency signal other than CNG (1100 Hz) or FC (1300 Hz), the quasi-calling signal and the signal from the calling station are superimposed and it is applied to the tonal counter 10. However, the CNG signal can be discriminated by analyzing the frequency distribution of the tonal counter 10. Accordingly, the quasi-calling tone may be analogue to the existing called tone without inserting the 0.3-second off-time as shown in FIG. 3. The CNG signal for 0.5 second period can be detected in 4.025 seconds after the line has been captured so that the $t_3$ period in FIG. 5 may be set to 5 seconds. In this manner, the switching in a short period is attained. Specifically, as shown in FIG. 11, when the quasi-calling tone sent out from its own apparatus and the CNG from the calling station are superimposed, the CNG (0.5-second on-time) is normally shorter than the quasi-calling tone (1-second on-time). If the signal is detected by the tonal counter 10, the quasi-calling tone and the superimposed signal are detected. The superimposed signal is not detected at 1100 Hz (CNG) but detected at a fixed frequency modulated by the quasi-calling tone frequency. Accordingly, by recognizing the fixed frequency signal as the CNG, it is possible to detect the CNG during the send-out of the quasi-calling signal. The 1300 Hz calling signal (FC) of the F network can also be detected during the send-out of the quasi-calling tone, as the CNG is done.

EMBODIMENT 3

In the above embodiment, the call time after the elapse of the $t_3$ period is set to approximately one minute (by taking the non-detection of the busy tone into consideration), and the line is opened after the elapse of the time. However, since the calling station might be a facsimile device which does not send out the CNG, the CED or DIS may be sent out after the elapse of the call time. In this case, since the called station may be designed to receive the DIS twice for the countermeasure of echo, the DIS is resent twice or three times. If there is no response from the calling station after the DIS has been sent out the predetermined number of times or for a predetermined time period, the cml relay is activated to open the telephone line, and the apparatus returns to the stand-by status. When the binary protocol signal such as digital command signal (DCS) is received for the DIS, the facsimile communication is rapidly started.

The call time for the above process should be set to a little bit shorter than $T_1 = 35 + 5$ seconds in the CCITT Recommendation T30. It is shown by $T_1'$ in FIG. 12.

EMBODIMENT 4

In the embodiment 3, the CED and DIS are sent out after the elapse of the fixed time (shorter than $T_1$ of the CCITT T30) in consideration of the facsimile device which does not send out the CNG. However, when the operator at the called station hooks off for the called tone, the following method is effective.

If the off-hook state is detected after the quasi-bell tone has rung, the timer is started after the detection of the off-hook state to measure a time to the on-hook state. If this time is within a predetermined time $T_2$ (which is 4–10 seconds in consideration of no response by the operator at the called station or resetting of the hand set after recognition of the CNG), the cml relay is closed again before the station recognizes the off-signal after the detection of the on-hook state to capture the line by the facsimile device. Then, the CED and DIS are sent out and the facsimile protocol is started. Alternatively, no timer operation may be carried out and the line is always switched to the facsimile device whenever the on-hook state is detected to send out the CED and DIS when no response is detected or the CNG is detected.

Figure 12:
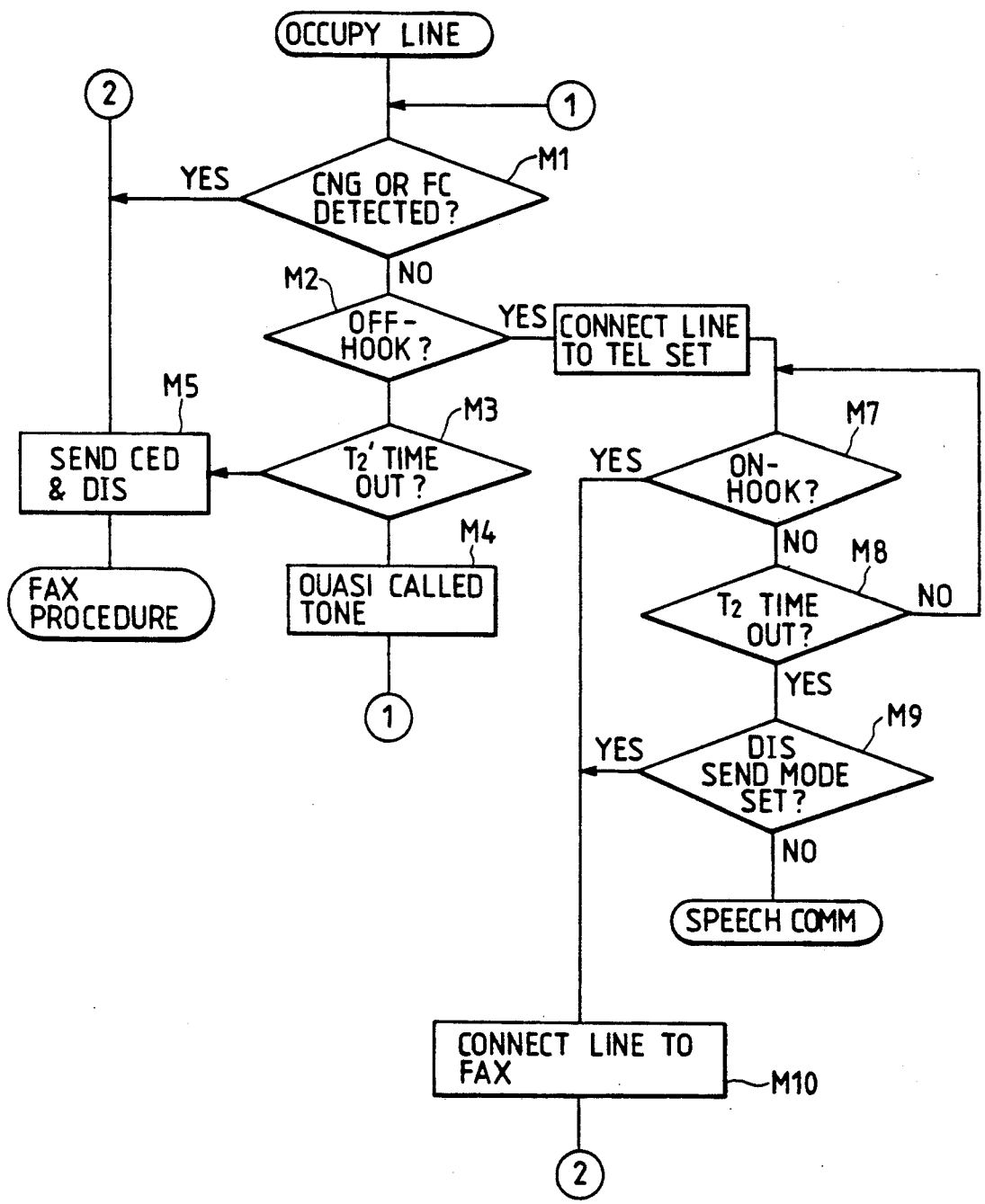
FIG. 12 shows a flow chart of a control operation in embodiments 3 and 4.

FIG. 12 shows a flow chart of a control operation of the controller of the embodiment 3 and the embodiment 4.

When a call is received, the cml relay is activated to capture the line. Then, the timer $T_1'$ is started and the process proceeds to a step M1. In the steps M1, M2 and M3, the reception and detection of the CNG and FC, the detection of the off-hook state of the hand set of the telephone set 2 and the time-out of the timer $T_1'$ are checked until the timer $T_1'$ times out. If the CNG/FC and the off-hook state are not detected, the quasi-calling tone is sent to the line for the period $t_2$ at every elapse period $t_1$ in a step M4 in a manner shown in FIG. 7. If the CNG/FC is detected in the step M1 or the time-out of the timer $T_1'$ is detected in the step M3, the process proceeds to a step M5 to send out the CED and DIS to the line 1. Then, the facsimile communication is started.

If the off-hook state of the telephone set 2 is detected in the step M2, the process proceeds to a step M6 to connect the line 1 to the telephone set 2 and start the timer $T_2$. Then, the process proceeds to a step M7. In the steps M7 and M8, whether the telephone set 2 has been hooked on or not before the timer $T_2$ times out is determined. If the telephone set has been hooked on before the timer $T_2$ timer out, it is determined that the calling station may possibly a facsimile device. In a step M10, the cml relay is activated again to switch the line to the facsimile device. Then, the process proceeds to the step M5.

On the other hand, if the time-out of timer $T_2$ is detected in the step M8, whether the DIS send-out mode has been set by a mode key (not shown) of the console unit 17 or not is determined in a step M9. If the DIS send-out mode has been set, the process proceeds to a step M/O to start the facsimile communication. If the DIS send-out mode has not been set, the speech communication is continued.

EMBODIMENT 5

In the above embodiment, the period $t_3$ is set to approximately 8 seconds. If it is desired to assure switching although it takes a longer time or start to call the called station even if the CNG is not detected, the period $t_3$ may be variable (operator may set by manipulation means) depending on the situation of facilities. Alternatively, the period $t_3$ is monitored, and if it does not or likely not to meet the detection time (it may possibly be CNG or FC), the monitor time may be extended to delay to call the called station. In this case, when the call to the called station has been started, it is assumed that a human will respond and the busy tone is monitored. In this manner, the detection rate is improved.

Figure 13:
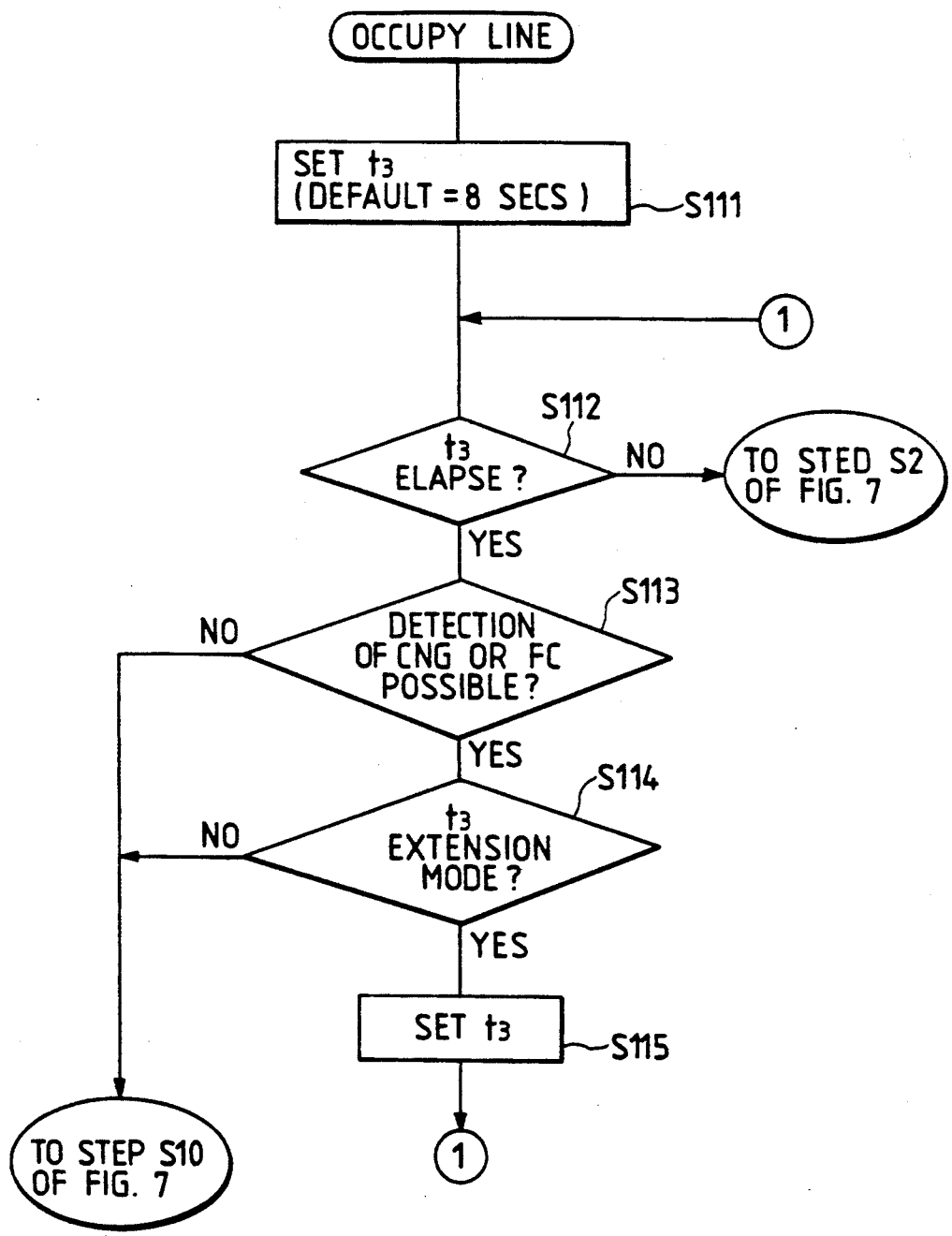
FIG. 13 shows a flow chart of a control operation of embodiment 5.

FIG. 13 shows a flow chart of the control operation of the embodiment 5. The step S1 in FIG. 7 is substituted by FIG. 13.

In a step S111, the timer $t_3$ is set to a value which has been preset by a key entry from the console unit 17 (or 8 seconds if there is no key entry) and the timer is started. In a step S112, whether the timer $t_3$ has timed out or not is determined.

If the timer $t_3$ has not timed out, the process proceeds to the step S2 of FIG. 7. If the timer $t_3$ has timed out, whether the CNG or FC may possibly be detected by the tonal counter 10 or not is determined in the step S3. If the CNG or FC may possibly be detected, the process proceeds to a step S114 to determine whether the $t_3$ extention mode has been set or not. If the $t_3$ extention mode has been set, the timer $t_3$ is started again in a step S115 (different time count may be set), and the process returns to the step S112.

In the step S113, if there is no possibility of detecting the CNG or FC and the $t_3$ extention mode has not been set in the step S114, the process proceeds to the step S10 of FIG. 7. In the embodiment 5, the return to the step S1 in FIG. 7 (①) is substituted by the return to the step S112 in FIG. 13.

EMBODIMENT 6

In the above embodiment, the quasi-called tone which is sent out to the line after the line has been captured is as similar as possible to the called tone of the station to which the calling station is connected so that the operator of the calling station feels no strange sense. By allowing the operator to set the format of the quasi-called tone, that is, $t_1$, $t_2$ and frequencies thereof by the console unit 17 of the apparatus, it is possible to simulate to the format of the called tone defined in a country of installation. Conversely, by setting a different called tone than that of the station, it may be possible to request waiting to the calling station operator.

In order to inform the call to the called station when the call is received, the called tone of the telephone set or bell tone by the speaker 14 may be generated with different format and frequency for one ring or for the $t_3$ period after the line has been captured so that the called station operator may be informed that the switching control is underway. In this manner, the operability at the called station is improved.

As shown in FIG. 14, this process discriminates the change of the frequency and the format as is done in the process after the elapse of the period $t_3$.

Figure 15B:
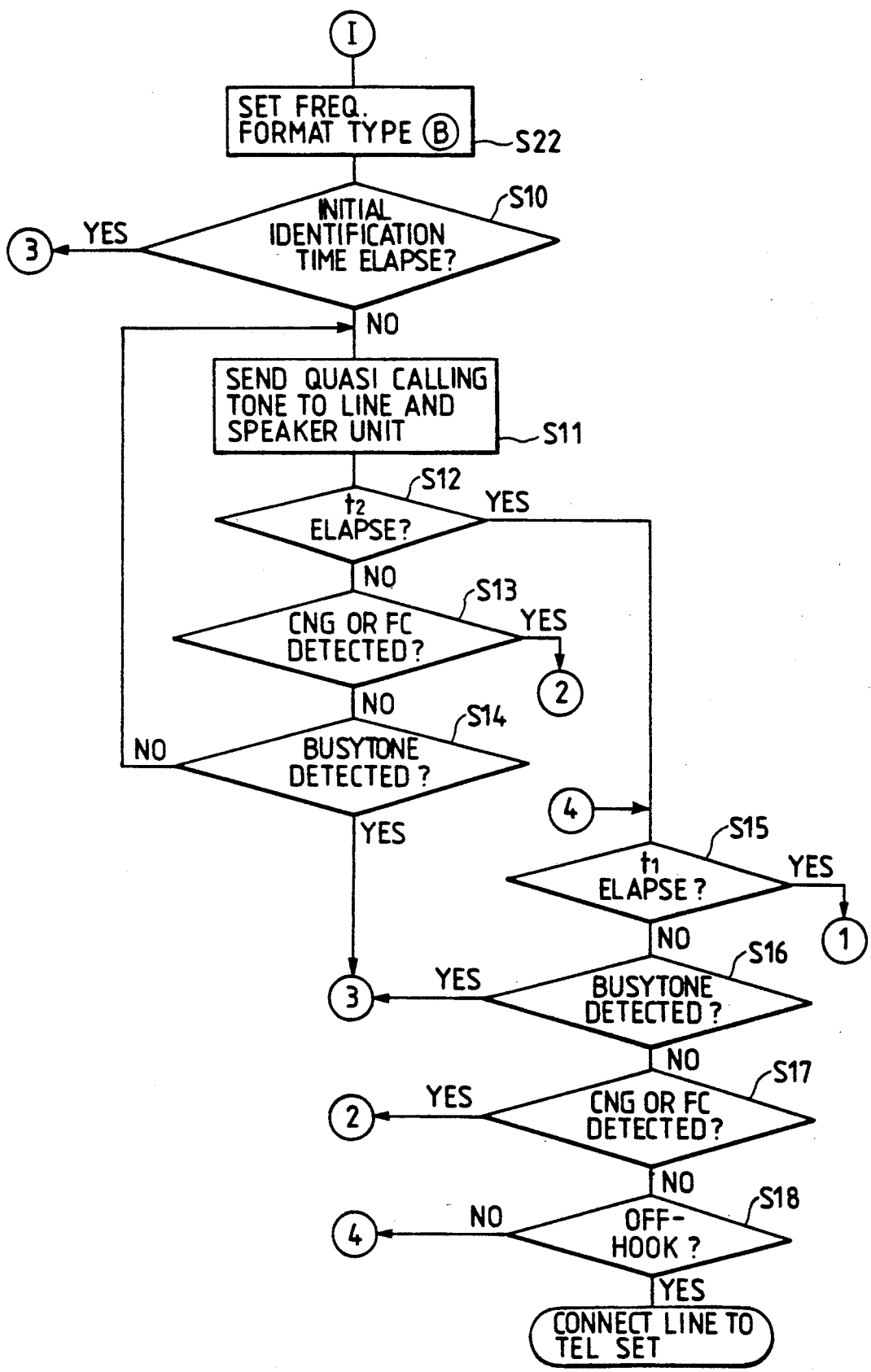

FIG. 15 shows a flow chart of a control operation of the embodiment 6. A difference between FIG. 15 and FIG. 7 resides in that a step S22 is added between the steps S7 and S10 of FIG. 7, and a step S21 is added between the steps S2 and S6. Other steps are same as those in the control operation of FIG. 7.

In the steps S21 and S22, the ringing frequency format of the speaker 14 is set. The ringing frequency format is preset by the key entry from the console unit 17. In the step S21, a frequency format Ⓐ is set, and in the step S22, a frequency format Ⓑ is set. By those steps, the quasi-bell tone is changed as shown in FIG. 14.

EMBODIMENT 7

In the above embodiment, the significant signals such as CNG, FC and busy tone are monitored by the transmission interval of the quasi-called tone and the off-time in the signal. Such quasi-called tone may be replaced by or combined with a message such as "Please wait for a while". If the message is periodically sent out like the quasi-bell tone, the significant signals may be monitored between the messages. If the message is continuously sent out, it is necessary to detect the CNG and FC while the message is sent out. In this case, if the half-duplex communication system as described in the embodiment 2 is used, the signal applied to the tonal counter is the superposition of the external signal and the signal which is sent out by its own device. Thus, it is necessary to detect the significant signal by filtering out the CNG component and the FC component by the message send-out unit or suppress the turn-around by a hybrid circuit in the network controller.

By the above control, it is not necessary to detect the voice, and the problem of unnatural operation of forcing the operator at the calling station to make voice and the problem of long time required from the detection of signal during the send-out of the voice message to the start of the facsimile communication are solved.

EMBODIMENT 8

In the above embodiment, if the significant signal is not detected after the period $t_3$ has been elapsed, the call is informed to the called station operator by the speaker in the apparatus. However, if the quality of the quasi-bell tone is poor or if the facsimile device is located at a distant place from the telephone set, the operator may not hear the quasi-bell tone of the facsimile device.

In this case, the relay H and the relay C in FIG. 1 may be closed and the ringer of the telephone set 2 may be rung by a quasi-CI signal generator 11 in order to solve the above problems.

EMBODIMENT 9

Instead of setting the ringer of the telephone set 2 in the non-ring mode, the relay H 12 in FIG. 1 may be positioned at an upper position whenever the telephone set 2 is not used so that the ringer of the telephone set 2 is not rung when a calling signal comes from the line 1. When the hand set is hooked on to use the telephone set 2, it is detected by the hook status detector 4 and the relay H 12 is returned to a lower position to connect the line 1 to the telephone set 2. When a power line fulls or the power of the apparatus is turned off, the relay H 12 is at the lower position so that the ringer of the telephone set 2 is rung when a calling signal comes from the line 1.

Figure 16:
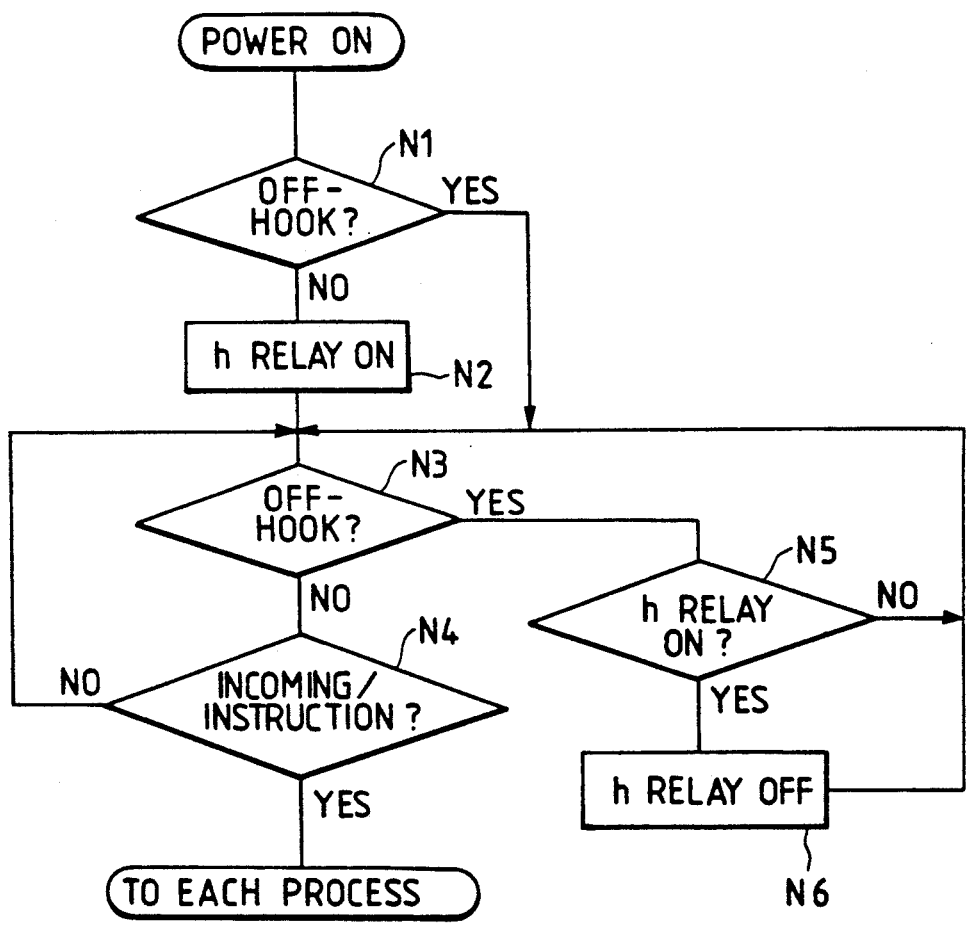
FIG. 16 shows a flow chart of a control operation of embodiment 9.

FIG. 16 shows a flow chart of a control operation of the embodiment 9.

When the power supply is turned on, the process proceeds to a step N1 to determine if the hand set of the telephone set 2 has been placed in an off hook state or not. If it has not been placed in an off hook state, the relay H 12 is activated in a step N2 and the process proceeds to a step N3. If the hand set has been placed in an off hook state, the process proceeds to the step N3. In the step N3, whether the telephone set 2 has been taken off the hook or not is determined, and if it has been taken off the hook, whether the relay H is on or not is determined in a step N5. If the relay H is on, the relay H is turned off in a step N6. Then, the process returns to the step N3.

If the telephone set 2 has not been taken off the hook in the step N3, the relay H is turned on in a step N4, and whether other command by the call or the key entry from the console unit 17 has been received or not is determined.

By the above control, the non-ringing reception of call by the facsimile device is attained.

EMBODIMENT 10

Figure 17:
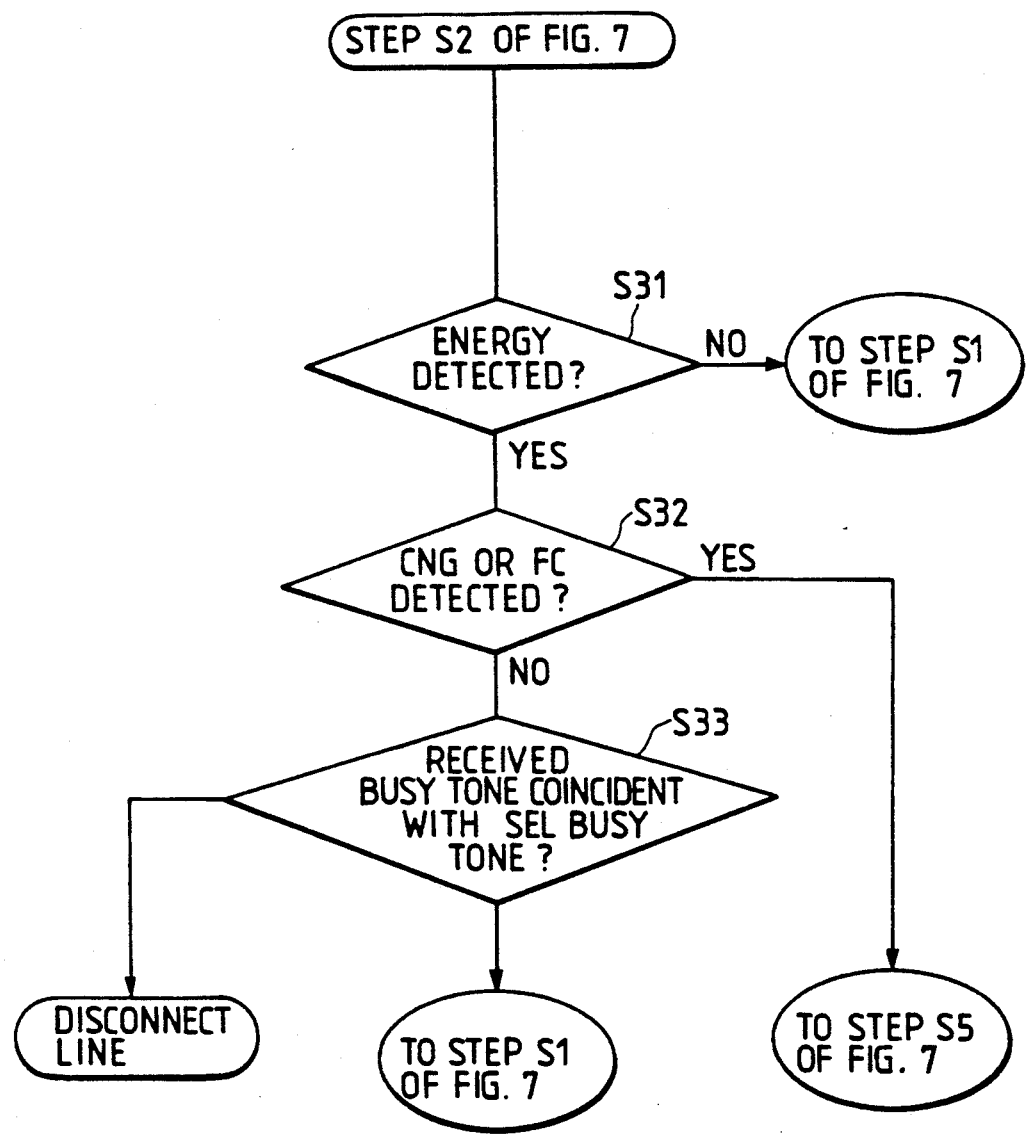
FIG. 17 shows a flow chart of a control operation of embodiment 10.

In the above embodiment, the significant signal as well as the busy tone are monitored to effectively utilize the line. Alternatively, the parameters (frequency, on-time, off-time, etc.) of the busy tone may be set by the operator through the console unit 17. Thus, a different busy tone may be set depending on the country to prevent a misoperation. The control of the embodiment 10 may be attained by replacing the steps S3 and S4 of FIG. 7 by steps S31-S33 shown in FIG. 17.

The step S31 to detect an energy the detection of SDT in FIG. 6(1)) is provided before the detection of the CNG/FC and the detection of the busy tone. If the energy is not detected, the process returns to the step S1. If the energy is detected, the detection of the CNG/FC is checked in the step S32. If the CNG/FC is detected, the process proceeds to the step S5, and if the CNG/FC is not detected, whether the parameters of the received busy tone are equal to the predetermined parameters or not is determined in a step S33. If they are equal in the step S33, the line 1 is opened, and if they are not equal, the process returns to the step S7.

In this manner, the line is opened only when the predetermined busy tone is detected.

EMBODIMENT 11

In the above embodiment, the quasi-called tone sent out to the telephone line and the quasi-bell tone generated by the speaker of the apparatus are identical. Alternatively, they may be set by the operator through the console unit 17 to generate different tones. Where a plurality of telephone lines are used, the line by which the call has been received can be recognized by changing the tones. Since the ordinary quasi-called tone is sent back to the calling station, no strange feeling is imparted to the calling station.

(1) In accordance with the present embodiment, the line is captured without ringing for the calling signal from the telephone line. Then, the quasi-called tone is sent out to the line and the significant signal from the calling station is detected during the off-time $t_2$ of the quasi-called tone sequence. If the significant signal such as CNG or FC is detected in the predetermined time $t_3$, the facsimile communication is started, and if it is not detected, the quasi-bell tone is sent out from the facsimile device to call the operator at the called station. As a result, where the calling station is a telephone set, a normal telephone operation can be attained by both the calling station and the called station.

where the calling station is an auto-send facsimile device, the calling station operates in an ordinary facsimile transmission mode and the called station operates a non-ringing auto-receive mode.

Thus, a more natural and easy-to-operate apparatus to the operator is provided.

Further, since the voice response is not required;

a memory for the voice response is not necessary and the cost of the apparatus is reduced.

The time required before the called station operator is called or the facsimile auto-receive mode is started can be reduced by the send-out time of the voice response message.

(2) In the case (1), by allowing to change the on-time ($t_1$), off-time ($t_2$) and frequency of the quasi-called tone, similar patterns to those of the called tones of various exchanges can be produced. Thus, the operator at the calling station has less strange feeling in the operation.

(3 In the ) case (1), by detecting the CNG/FC signal as well as the busy tone from the exchange during the detection period of the significant signal, the line can be efficiently utilized by immediately opening the line when the busy tone is detected by the apparatus if the calling station opens the telephone line before the called station operator takes the hook off the telephone set.

(4) In the case (1), by providing the off-time $t_4$ ($t_2 > t_4$) in the on-time $t_2$ of the quasi-called tone and monitoring the significant signal during the off-time $t_4$, the TEL/FAX switching time is essentially same as that required in the full duplex communication system.

(5) In the case (1), by synchronizing the ringing of the quasi-bell tone by the apparatus with the send-out of the quasi-called tone, the significant signal and the busy signal can be monitored during the interval of the tone signals so that the apparatus may cope with the facsimile device which sends out the CNG signal with a delay.

(6) In the case (1), by providing the call time $t_5$ after the elapse of the time $t_3$ and opening the telephone line after the elapse of the time $t_5$ to return the apparatus to the stand-by status, the apparatus can cope with when the busy tone is not detected.

(7) In the case (1), by setting the quasi-called tone to a single frequency signal other than the CNG (1100 Hz) and the FC (1300 Hz), the signal from the apparatus can be discriminated when it is superimposed on the external signal. Thus, the significant signal (CNG, FC) can be detected in the full duplex mode while the quasi-called tone is sent out and the rapid TEL/FAX switching is attained.

(8) In the case (6), by sending out the CED/DIS n times after the elapse of the time $t_5$, and starting the facsimile communication if the binary protocol signal such as DCS is received for the DIS from the calling station and opening the telephone line in case of no response and returning the apparatus to the stand-by status, the facsimile device of the manual send mode which does not send out the CNG from the calling station can be operated.

(9) In the case (6), when the off-hook state is detected after the quasi-bell tone has been rung and then the on-hook state is detected, the apparatus captures the line before the station recognizes the disconnection signal and sends out the CED/DIS. If there is a response thereto, the facsimile communication is started. Thus, the facsimile reception is attained even if the operator at the received station takes the hook off the telephone set before the elapse of the time $t_5$.

(10) In the case (9), a timer which is started after the detection of the off-hook to measure a time until the subsequent on-hook is provided, and if this time period is within a predetermined period, the apparatus captures the line before the station recognizes the disconnection signal and sends out CED/DIS. If there is a response thereto, the facsimile protocol is started. Thus, the facsimile reception is attained even if the operator at the called station takes the hook off the telephone set before the elapse of the time $t_5$

(11) In the case (1), by varying the time $t_3$, the timing to call the operator at the called station can be changed for the telephone dominate mode and the facsimile dominate mode.

(12) In the case (11), by monitoring for the time $t_3$ and extending the monitor time when the detection of the significant signal is not likely to delay the timing to start the call for the operator at the called station, the operability of the operator is improved.

When the call for the operator at the called station is started, it is assumed that a human is responding and the busy tone is monitored. Thus, the detection rate is improved.

(13) In the case (1), the format and frequency of the calling signal to the operator at the called station is changed by the speaker 14 for the first called tone or the first ring of the bell tone by the speaker or for the time $t_3$ after the line has been captured so that the reception of the call or the switching control operation is informed to the operator. In this manner, the operability by the operator is improved.

(14) In the case (3), by monitoring the CNG, FC and busy tone as well as the voice, the call to the operator at the called station can be immediately started when the voice from the calling station is detected. Thus, the operability is improved.

(15) In the case (1), by providing the voice memory in the apparatus, the voice message stored in the memory can be sent out in place of the quasi-called tone.

(16) In the case (15), by filtering out the CNG component or the FC component by the message send-out unit or suppressing the turn-around in the hybrid circuit of the network controller, the significant signal can be detected in the full duplex communication mode while the message is sent out.

(17) In the case (1), by providing the quasi-CI generator 11 to allow the call of the operator at the called station by any externally attached telephone set, the apparatus can cope with even if the operator is at a distant place from the apparatus or the quality of the quasi-bell tone generated by the apparatus is poor. Further, non-ringing reception is attained even if the telephone set of the facsimile device has no function to turn off the bell tone.

(18) In the case (3), by setting the parameters of the busy tone such as frequency band, on-time and off-time by the operator through the console unit 17, the apparatus can cope with different busy tones of different exchanges.

(19) In the case (1), by setting the quasi-called tone sent out to the line and the quasi-bell tone generated by the speaker 14, by the operator, the two tones may be set differently so that the calling line out of a plurality of telephone lines can be discriminated by the tone of the quasi-bell tone.

The present invention is not limited to the above embodiments but various modifications thereof may be made.

We claim:

1. A communication apparatus comprising:
   first detection means for detecting a calling signal from a line;
   means for generating a quasi-calling tone and sending out the quasi-calling tone to the line, wherein said quasi-calling tone has a predetermined frequency and a period composed of on-time interval $t_1$, off-time interval $t_2$, on-time interval $t_3$, and off-time interval $t_4$;
   second detection means for detecting a signal indicating data communication from a calling station; and
   means for effecting the data communication in response to the detection by said second detection means;
   wherein said second detection means detects the signal indicating data communication only during the off-time intervals $t_2$ and $t_4$.

2. A communication apparatus according to claim 1 further comprising means for sending out a calling tone after the quasi-calling tone has been sent out a predetermined number of times to inform the reception of the call to an operator.

3. A communication apparatus according to claim 2 further comprising speech means for effecting speech communication, the speech communication being enabled in response to the off-hook state of said speech means.

4. A communication apparatus according to claim 3 further comprising timer means operable in response to the off-hook state of said speech means, and means for starting the data communication when the on-hook state of said speech means is detected before said timer means times out.

5. A communication apparatus according to claim 2, further comprising means for setting the number of times of sending-out of the quasi-calling tone before sending-out means is operated.

6. A communication apparatus according to claim 2 wherein said second detection means detects the signal even after said sending out means has been operated.

7. A communication apparatus according to claim 1 wherein the data communication mode is automatically started after the quasi-calling tone has been sent out for a predetermined time period.

8. A communication apparatus according to claim 1, wherein the on-time interval $t_1$ and the on-time interval $t_3$ are of the same duration.

9. A communication apparatus according to claim 1, wherein the off-time interval $t_4$ is longer than the off-time interval $t_2$.

10. A communication apparatus according to claim 1, wherein said second detection means detects a frequency of a received signal, and determines reception of the signal indicating data communication when a frequency of the signal is detected at least a predetermined number of times.

11. A communication apparatus according to claim 1, further comprising means for setting a format of the quasi-calling tone.

12. A communication apparatus according to claim 1 further comprising means for detecting a voice signal from the calling station, the speech communication being started in response to the detection of voice.

13. A communication apparatus according to claim 1 wherein the quasi-calling tone is substituted by a voice message or combined with the voice message.

14. A communication apparatus according to claim 1 further comprising:
 a telephone set for speech communication;
 means for disconnecting the telephone set form the line; and
 means for sending out a calling signal to said telephone set.

15. A communication apparatus according to claim 14 further comprising means for disconnecting said telephone set to the line when a hand set of said telephone set is hook one and connecting the telephone set to the line only when the hand set is hooked off.

16. A communication apparatus according to claim 1, further comprising third detection means for detecting a signal indicating release of the line from the line, the line being opened in response to the detection of the busy tone.

17. A communication apparatus according to claim 16, further comprising mean for setting parameters for detection of the signal indicating release of the line by said third detection means.

18. A communication comprising the steps of:
 detecting a calling signal;
 generating a quasi-calling tone in response to the calling signal, wherein the quasi-calling tone has a predetermined frequency and a period composed of on-time interval $t_1$, off-time interval $t_2$, on-time interval $t_3$ and off-time interval $t_4$ longer than the off-time interval $t_2$;
 sending out the quasi-calling tone to a line;
 detecting a signal indicating data communication from a calling station only during the off-time intervals $t_2$ and $t_4$; and
 starting control of the data communication in response to the signal indicating data communication.

19. A communication apparatus comprising:
 first detection means for detecting a calling signal from a line;
 means for generating a quasi-calling signal and sending out the quasi-calling signal to the line, wherein said quasi-calling signal has a predetermined frequency and a period composed of on-time interval $t_1$ and off-time interval $t_2$;
 second detection means for detecting a signal indicating data communication from a calling station, wherein said signal has a different frequency from that of the quasi-calling signal; and
 means for effecting the data communication in response to the detection by said second detection means;
 wherein said second detection means detects a signal indicating data communication during sending-out of the quasi-calling signal, and also detects a signal indicating data communication only during the on-time interval $t_1$ and the off-time interval $t_2$.

20. A communication apparatus according to claim 19, wherein said second detection means detects a frequency of the received signal, and determines reception of the signal indication data communication when a frequency of the signal is detected at least a predetermined number of times.

21. A communication apparatus comprising:
 first detection means for detecting a calling signal from a line;
 means for generating a quasi-calling tone and sending out the quasi-calling tone to the line, wherein said quasi-calling tone has a first off-time interval and a second off-time interval longer than the first off-time interval;
 second detection means for detecting a signal indicating data communication from a calling station; and
 means for effecting the data communication in response to detection by said second detection means,
 wherein said second detection means detects the signal indicating data communication only while the quasi-calling tone is sent out when the calling signal is received and before the start of sending out of the quasi-calling tone.

22. A communication apparatus according to claim 21, wherein said second detection means detects the signal indicating data communication during the first and second off-time intervals.

* * * * *

UNITED STATES PATENT AND TRADEMARK OFFICE
CERTIFICATE OF CORRECTION

PATENT NO. : 5,185,783   Page 1 of 2
DATED : February 9, 1993
INVENTOR(S) : TAKETO TAKAHASHI, ET AL.

It is certified that error appears in the above-identified patent and that said Letters Patent is hereby corrected as shown below:

COLUMN 6
    Line 38, "not" should read --not.--.

COLUMN 7
    Line 31, "ously wherein Embodiment 1." should read --ously.--.

COLUMN 8
    Line 67, "possibly" should read --possibly be--.

COLUMN 10
    Line 17, "17" should read --17.--.

COLUMN 11
    Line 2, "fulls" should read --fails--.
    Line 11, "off hook" should read --off-hook--.
    Line 12, "off hook" should read --off-hook--.
    Line 15, "off hook" should read --off-hook--.

COLUMN 12
    Line 11, "station." should read --station; and--.
    Line 18, "required;" should read --required,--.
    Line 30, "(3 In the" should read --(3) In the--.

COLUMN 13
    Line 21, "time $t_5$" should read --time $t_5$.--.

UNITED STATES PATENT AND TRADEMARK OFFICE
CERTIFICATE OF CORRECTION

PATENT NO. : 5,185,783
DATED : February 9, 1993
INVENTOR(S) : TAKETO TAKAHASHI, ET AL.

It is certified that error appears in the above-identified patent and that said Letters Patent is hereby corrected as shown below:

COLUMN 14
    Line 30, "claim 1" should read --claim 1,--.
    Line 35, "claim 2" should read --claim 2,--.
    Line 40, "claim 3" should read --claim 3,--.
    Line 48, "before" should read --before said--.
    Line 50, "claim 2" should read --claim 2,--.
    Line 53, "claim 1" should read --claim 1,--.

COLUMN 15
    Line 4, "claim 1" should read --claim 1,--.
    Line 8, "claim 1" should read --claim 1,--.
    Line 11, "claim 1" should read --claim 1,--.
    Line 19, "14" should read --14,--.
    Line 21, "hook one" should read --hooked on--.
    Line 32, "communication" should read --communication method--.

COLUMN 16
    Line 23, "indication" should read --indicating--.

Signed and Sealed this

Eleventh Day of January, 1994

Attest:

BRUCE LEHMAN

*Attesting Officer*      *Commissioner of Patents and Trademarks*